United States Patent
Mindnich et al.

(10) Patent No.: US 10,198,475 B2
(45) Date of Patent: Feb. 5, 2019

(54) DATABASE CALCULATION ENGINE HAVING FORCED FILTER PUSHDOWNS WITH DYNAMIC JOINS

(71) Applicants: Tobias Mindnich, Sulzbach (DE); Christoph Weyerhaeuser, Heidelberg (DE); Johannes Merx, Heidelberg (DE)

(72) Inventors: Tobias Mindnich, Sulzbach (DE); Christoph Weyerhaeuser, Heidelberg (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 361 days.

(21) Appl. No.: 14/607,681

(22) Filed: Jan. 28, 2015

(65) Prior Publication Data

US 2016/0217182 A1    Jul. 28, 2016

(51) Int. Cl.
*G06F 17/30* (2006.01)

(52) U.S. Cl.
CPC .. *G06F 17/30498* (2013.01); *G06F 17/30466* (2013.01)

(58) Field of Classification Search
CPC ............ G06F 17/30498; G06F 17/30466
See application file for complete search history.

(56) References Cited

U.S. PATENT DOCUMENTS

| | | | | |
|---|---|---|---|---|
| 8,195,643 B2* | 6/2012 | Weyerhaeuser | .. | G06F 17/30463 707/713 |
| 8,914,387 B2* | 12/2014 | Weyerhaeuser | .. | G06F 17/30463 707/754 |
| 2005/0060292 A1* | 3/2005 | Day | ............... | G06F 17/30474 |
| 2013/0290354 A1* | 10/2013 | Weyerhaeuser | .. | G06F 17/30463 707/754 |

* cited by examiner

*Primary Examiner* — Apu M Mofiz
*Assistant Examiner* — Husam Turki Samara
(74) *Attorney, Agent, or Firm* — Mintz Levin Cohn Ferris Glovsky and Popeo, P.C.

(57) ABSTRACT

A query that requests a filter attribute is received by a database server from a remote application server that is associated with a calculation scenario that defines a data flow model including one or more calculation nodes. Subsequently, the database server instantiates the calculation scenario. As part of the instantiation, the calculation scenario is optimized by (i) pushing down a filter attribute from a first node to a lowest available child node, (ii) removing the filter attribute from the first node, and (iii) removing non-required join-attributes from the instantiated calculation scenarios. Thereafter, the operations defined by the calculation nodes of the instantiated calculation scenario can be executed to result in a responsive data set. Next, the data set is provided to the application server by the database server.

20 Claims, 8 Drawing Sheets

DATABASE CALCULATION ENGINE HAVING FORCED FILTER PUSHDOWNS WITH DYNAMIC JOINS

TECHNICAL FIELD

The subject matter described herein relates to a database system that incorporates a calculation engine that instantiates calculation scenarios in which, as part of the instantiation process, filters are pushed down to a lowest possible level as part of dynamic joins.

BACKGROUND

Data flow between an application server and a database server is largely dependent on the scope and number of queries generated by the application server. Complex calculations can involve numerous queries of the database server which in turn can consume significant resources in connection with data transport as well as application server-side processing of transported data. Calculation engines can sometimes be employed by applications and/or domain specific languages in order to effect such calculations. Such calculation engines can execute calculation models/scenarios that comprise a plurality of hierarchical calculation nodes.

SUMMARY

In one aspect, a query that requests a filter attribute is received by a database server from a remote application server that is associated with a calculation scenario that defines a data flow model including one or more calculation nodes. Subsequently, the database server instantiates the calculation scenario. As part of the instantiation, the calculation scenario is optimized by (i) pushing down a filter attribute from a first node to a lowest available child node, (ii) removing the filter attribute from the first node, and (iii) removing non-required join-attributes from the instantiated calculation scenarios. Thereafter, the operations defined by the calculation nodes of the instantiated calculation scenario can be executed to result in a responsive data set. Next, the data set is provided to the application server by the database server.

At least a portion of paths and/or attributes defined by the calculation scenario can, in some implementations, not be required to respond to the query. In such cases, the instantiated calculation scenario can omit the paths and attributes defined by the calculation scenario that are not required to respond to the query.

At least one of the calculation nodes can filter results obtained from the database server. At least one of the calculation nodes can sort results obtained from the database server.

The calculation scenario can be instantiated in a calculation engine layer by a calculation engine. The calculation engine layer can interact with a physical table pool and a logical layer. The physical table pool can include physical tables containing data to be queried, and the logical layer can define a logical metamodel joining at least a portion of the physical tables in the physical table pool. The calculation engine can invoke an SQL processor for executing set operations.

An input for each calculation node can include one or more of: a physical index, a join index, an OLAP index, and another calculation node. Some or all calculation nodes can have at least one output table that is used to generate the data set. At least one calculation node can consume an output table of another calculation node.

The query can be forwarded to a calculation node in the calculation scenario that is identified as a default node if the query does not specify a calculation node at which the query should be executed. The calculation scenario can include database metadata.

Computer program products are also described that comprise non-transitory computer readable media storing instructions, which when executed one or more data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter allows for filters specified by a query to be pushed down to a lowest level possible as part of a calculation scenario instantiation process even when dynamic joins are employed. As a result, unnecessary intermediate results can be avoided which, in turn, results in more efficient query processing.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
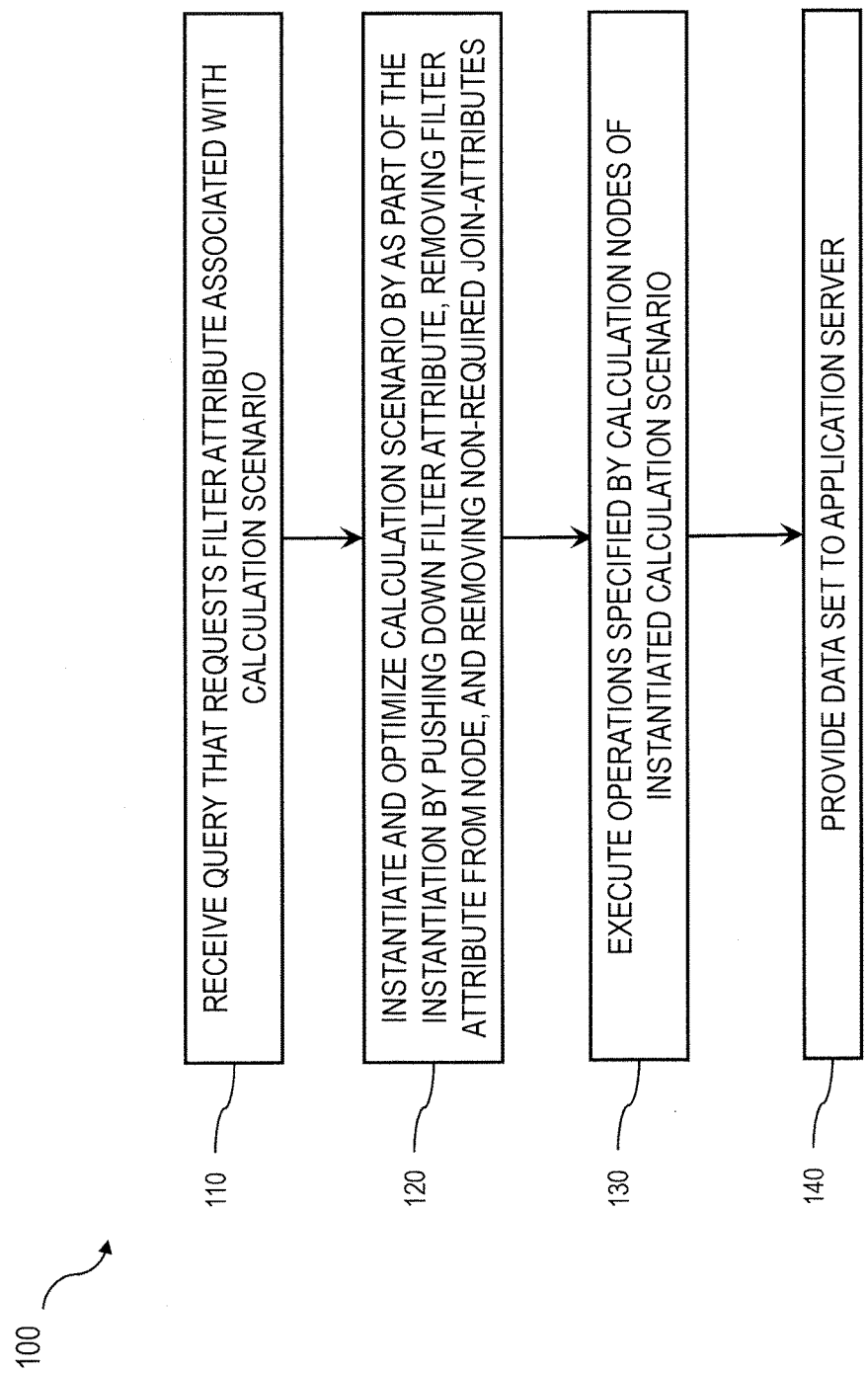
FIG. 1 is a process flow diagram illustrating execution of a calculation scenario having a dynamic top operator.

FIG. 1 is a process flow diagram 100 illustrating a method in which, at 110, a query requesting a filter attribute is received by a database server from a remote application server that is associated with a calculation scenario that defines a data flow model including one or more calculation nodes. Subsequently, at 120, the database server instantiates the calculation scenario. As part of the instantiation, the calculation scenario is optimized by (i) pushing down a filter attribute from a first node to a lowest available child node, (ii) removing the filter attribute from the first node, and (iii) removing non-required join-attributes from the instantiated calculation scenarios. Thereafter, at 130, the operations defined by the calculation nodes of the instantiated calculation scenario can be executed to result in a responsive data set. Next, at 140, the data set is provided to the application server by the database server.

Figure 2:
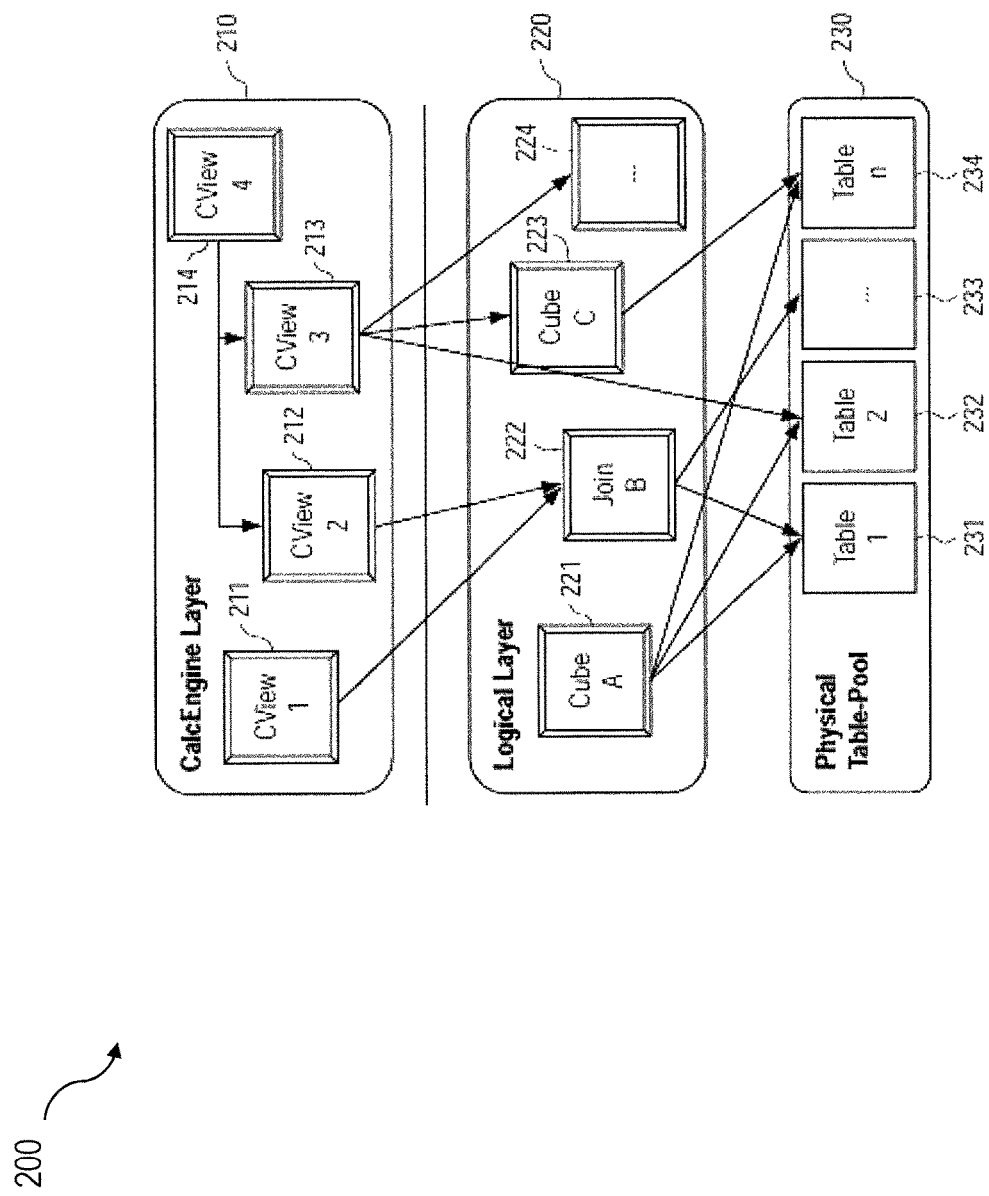
FIG. 2 is a diagram illustrating a calculation engine layer, a logical layer, a physical table pool and their interrelationship.

FIG. 2 is a diagram 200 that illustrates a database system in which there are three layers, a calculation engine layer 210, a logical layer 220, and a physical table-pool 230. Calculation scenarios can be executed by a calculation engine which can form part of a database or which can be part of the calculation engine layer 210 (which is associated with the database). The calculation engine layer 210 can be based on and/or interact with the other two layers, the logical layer 220 and the physical table pool 230. The basis of the physical table pool 230 consists of physical tables (called indexes) containing the data. Various tables can then be joined using logical metamodels defined by the logical layer 220 to form a new index. For example, the tables in a cube (OLAP view) can be assigned roles (e.g., fact or dimension tables) and joined to form a star schema. It is also possible to form join indexes, which can act like database view in environments such as the Fast Search Infrastructure (FSI) by SAP AG.

As stated above, calculation scenarios can include individual calculation nodes 211-214, which in turn each define operations such as joining various physical or logical indexes and other calculation nodes (e.g., CView 4 is a join of CView 2 and CView 3). That is, the input for a calculation node 211-214 can be one or more physical, join, or OLAP views or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

In calculation scenarios, two different representations can be provided. First, a stored ("pure") calculation scenario in which all possible attributes are given. Second, an instantiated/executed model that contains only the attributes requested in the query (and required for further calculations). Thus, calculation scenarios can be created that can be used for various queries. With such an arrangement, calculation scenarios can be created which can be reused by multiple queries even if such queries do not require every attribute specified by the calculation scenario. For on-the-fly scenarios this means that the same calculation scenario (e.g., in XML format, etc.) can be used for different queries and sent with the actual query. The benefit is that on application server side the XML description of a calculation scenario can be used for several queries and thus not for each possible query one XML has to be stored.

Further details regarding calculation engine architecture and calculation scenarios can be found in U.S. Pat. No. 8,195,643, the contents of which are hereby fully incorporated by reference.

Figure 3:
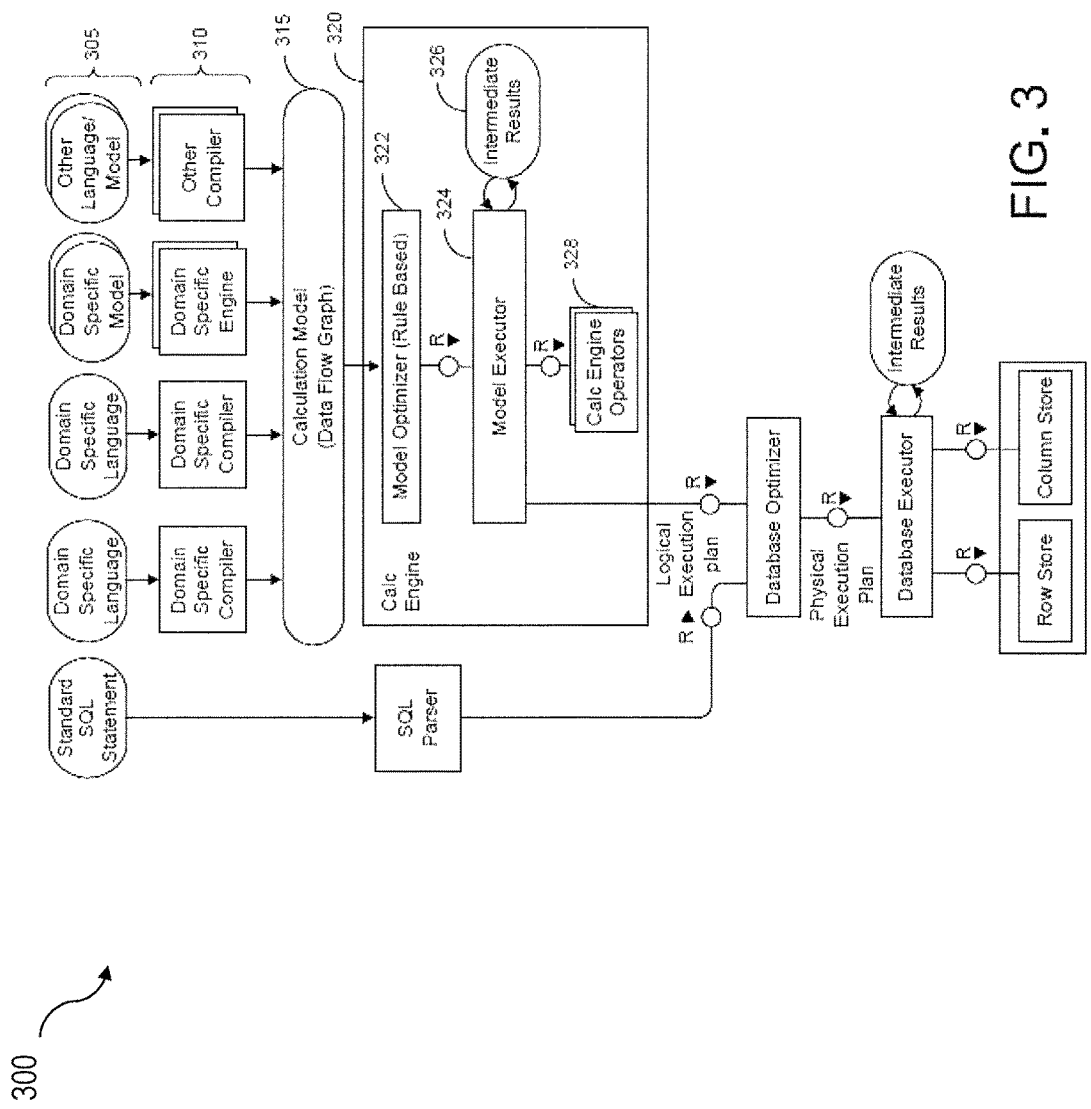
FIG. 3 is a diagram illustrating an architecture for processing and execution control.

FIG. 3 is a diagram 300 illustrating a sample architecture for request processing and execution control. As shown in FIG. 3, artifacts 305 in different domain specific languages can be translated by their specific compilers 310 into a common representation called a "calculation scenario" 315 (illustrated as a calculation model). To achieve enhanced performance, the models and programs written in these languages are executed inside the database server. This arrangement eliminates the need to transfer large amounts of data between the database server and the client application. Once the different artifacts 305 are compiled into this calculation scenario 315, they can be processed and executed in the same manner. The execution of the calculation scenarios 315 is the task of a calculation engine 320.

The calculation scenario 315 can be a directed acyclic graph with arrows representing data flows and nodes that represent operations. Each calculation node has a set of inputs and outputs and an operation that transforms the inputs into the outputs. In addition to their primary operation, each calculation node can also have a filter condition for filtering the result set. The inputs and the outputs of the operations can be table valued parameters (i.e., user-defined table types that are passed into a procedure or function and provide an efficient way to pass multiple rows of data to the application server). Inputs can be connected to tables or to the outputs of other calculation nodes. Calculation scenarios 315 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 315 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result he or she can use a split. Then, the nodes can be automatically multiplied between split and merge and partition the data.

Calculation scenarios 315 are more powerful than traditional SQL queries or SQL views for many reasons. One reason is the possibility to define parameterized calculation schemas that are specialized when the actual query is issued. Unlike a SQL view, a calculation scenario 315 does not describe the actual query to be executed. Rather, it describes the structure of the calculation. Further information is supplied when the calculation scenario is executed. This further information can include parameters that represent values (for example in filter conditions). To obtain more flexibility, it is also possible to refine the operations when the model is invoked. For example, at definition time, the calculation scenario 315 may contain an aggregation node containing all attributes. Later, the attributes for grouping can be supplied with the query. This allows having a predefined generic aggregation, with the actual aggregation dimensions supplied at invocation time. The calculation engine 320 can use the actual parameters, attribute list, grouping attributes, and the like supplied with the invocation to instantiate a query specific calculation scenario 315. This instantiated calculation scenario 315 is optimized for the actual query and does not contain attributes, nodes or data flows that are not needed for the specific invocation.

When the calculation engine 320 gets a request to execute a calculation scenario 315, it can first optimize the calculation scenario 315 using a rule based model optimizer 322. Examples for optimizations performed by the model optimizer can include "pushing down" filters and projections so that intermediate results 326 are narrowed down earlier, or the combination of multiple aggregation and join operations into one node. The optimized model can then be executed by a calculation engine model executor 324 (a similar or the same model executor can be used by the database directly in some cases). This includes decisions about parallel execution of operations in the calculation scenario 315. The model executor 324 can invoke the required operators (using, for example, a calculation engine operators module 328) and manage intermediate results. Most of the operators are executed directly in the calculation engine 320 (e.g., creating the union of several intermediate results). The remaining nodes of the calculation scenario 315 (not implemented in the calculation engine 320) can be transformed by the model executor 324 into a set of logical database execution plans. Multiple set operation nodes can be combined into one logical database execution plan if possible.

The model optimizer 322 can be configured to enable dynamic partitioning based on one or more aspects of a query and/or datasets used by queries. The model optimizer can implement a series of rules that are triggered based on attributes of incoming datasets exceeding specified thresholds. Such rules can, for example, apply thresholds each with a corresponding a parallelization factor. For example, if the incoming dataset has 1 million rows then two partitions (e.g., parallel jobs, etc.) can be implemented, or if the incoming dataset has five million rows then five partitions (e.g., parallel jobs, etc.) can be implemented, and the like.

The attributes of the incoming datasets utilized by the rules of model optimizer 322 can additionally or alternatively be based on an estimated and/or actual amount of memory consumed by the dataset, a number of rows and/or columns in the dataset, and the number of cell values for the dataset, and the like.

The calculation engine 320 typically does not behave in a relational manner. The main reason for this is the instantiation process. The instantiation process can transform a stored calculation model 315 to an executed calculation model 315 based on a query on top of a calculation view which is a (catalog) column view referencing one specific node of a stored calculation model 315. Therefore, the instantiation process can combine the query and the stored calculation model and build the executed calculation model.

The main difference between a relational view or SQL with subselects and a calculation model is that the projection list in a relational view is stable also if another SQL statement is stacked on top whereas in a calculation model the projection list of each calculation node in the calculation model is depending on the projection list of the query or the parent calculation node(s).

With a calculation model 315, a user can provide a set of attributes/columns on each calculation node that can be used by the next calculation node or the query. If attributes/columns are projected in a query or on the parent calculation node, then just a subset of these requested attributes/columns can be considered in the executed calculation model.

The calculation engine 320 can offer model designers the possibility to enrich their data model with a forced filter pushdown semantic which can be seen as a generic and flexible way to express a filter injection. In contrast to simply allowing a user to specify a filter condition on a specific node level, the current subject matter is directed to a forced filter pushdown feature. With a forced filter pushdown feature, if attributes are flagged for forced pushdown in a query, the calculation engine 320 can ensure that all attributes are removed on the defined data flow graph (as part of the instantiation process). In some variations, a runtime error can be indicated if attributes are still required on the defined data flow path. With such functionality, users can easily access the logic in normal SQL WHERE conditions and, in some cases, specifically request such attributes.

Figure 4:
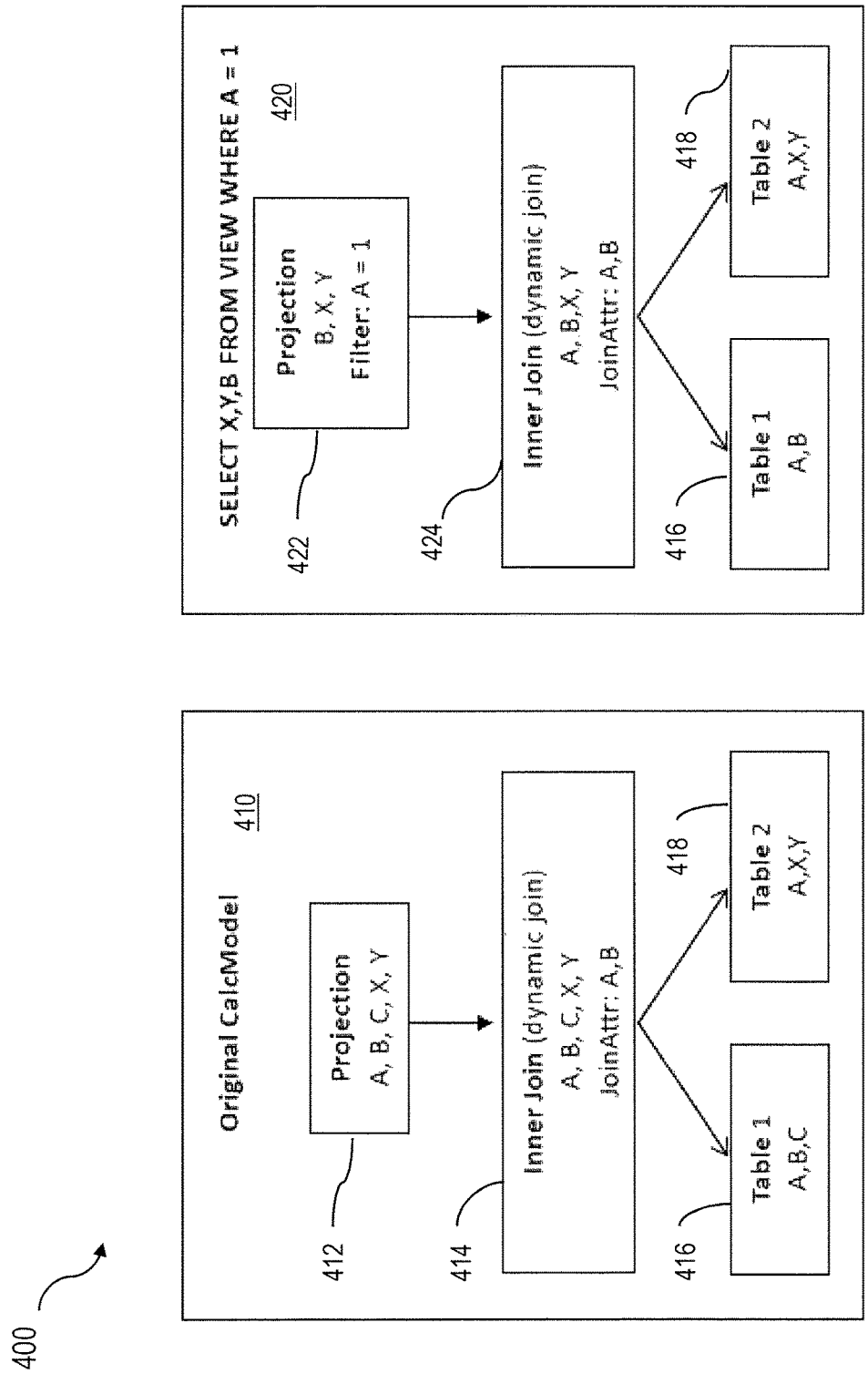
FIG. 4 is a diagram illustrating a first calculation scenario and a corresponding instantiation of the first calculation scenario.

Forced filter pushdowns can only be successful applied if attributes are not needed in any top level operator of the data flow model which easily can be the case if marked attributes are used as join attributes. FIG. 4 is a diagram 400 illustrating a calculation model 410 and a corresponding instantiated calculation model 420. The calculation model 410 includes a projection node 412 that enables a projection of A, B, C, X, Y which requires a dynamic join via node 414 on Table 1 416 and Table 2 418 along attributes A, B. In response to receiving a query: SELECT X, Y, B FROM VIEW WHERE A=1, the calculation model 420 is instantiated so that the requested data can be obtained from Table 1 416 and Table 2 418. As illustrated in the instantiation 420, attribute A is only used for filtering (at the request node 422) and thus is not requested on the top level operator. As the filter evaluation in the instantiated calculation model 420 requires A to be requested on all child operators (dynamic join 422) and, furthermore column A is defined as join-attribute on the join node it can be seen that using attributes as forced filter pushdown and join attributes at the same time is not possible in most use cases.

In some implementations, the calculation engine 320 can utilize different join optimization techniques like join removal or so called dynamic joins. More information about dynamic joins can be found, for example, in U.S. patent application Ser. No. 14/083,267 entitled "Join Optimization in a Database" filed on Nov. 13, 2014, the content of which is hereby incorporated by reference. In specific calculation scenarios 315 and data models, dynamic joins can be very useful for model designers to achieve significant performance improvements—mainly caused by their ability to eliminate additional join-attributes that are not requested by the query. However, as the instantiation process of calculation engine 320 usually will also request filter attributes on lower levels (as illustrated in FIG. 4) and the attribute usage in the initial user query is hidden on lower levels of the execution model, filter attributes will also be used as join-attribute on dynamic join operations.

In order to enable the full functionality of both features and providing users the possibility to combine dynamic joins and the forced filter pushdown semantic in an easy and very flexible, the functionality of dynamic joins can be extended with the forced filter pushdown feature as provided herein.

Figure 5:
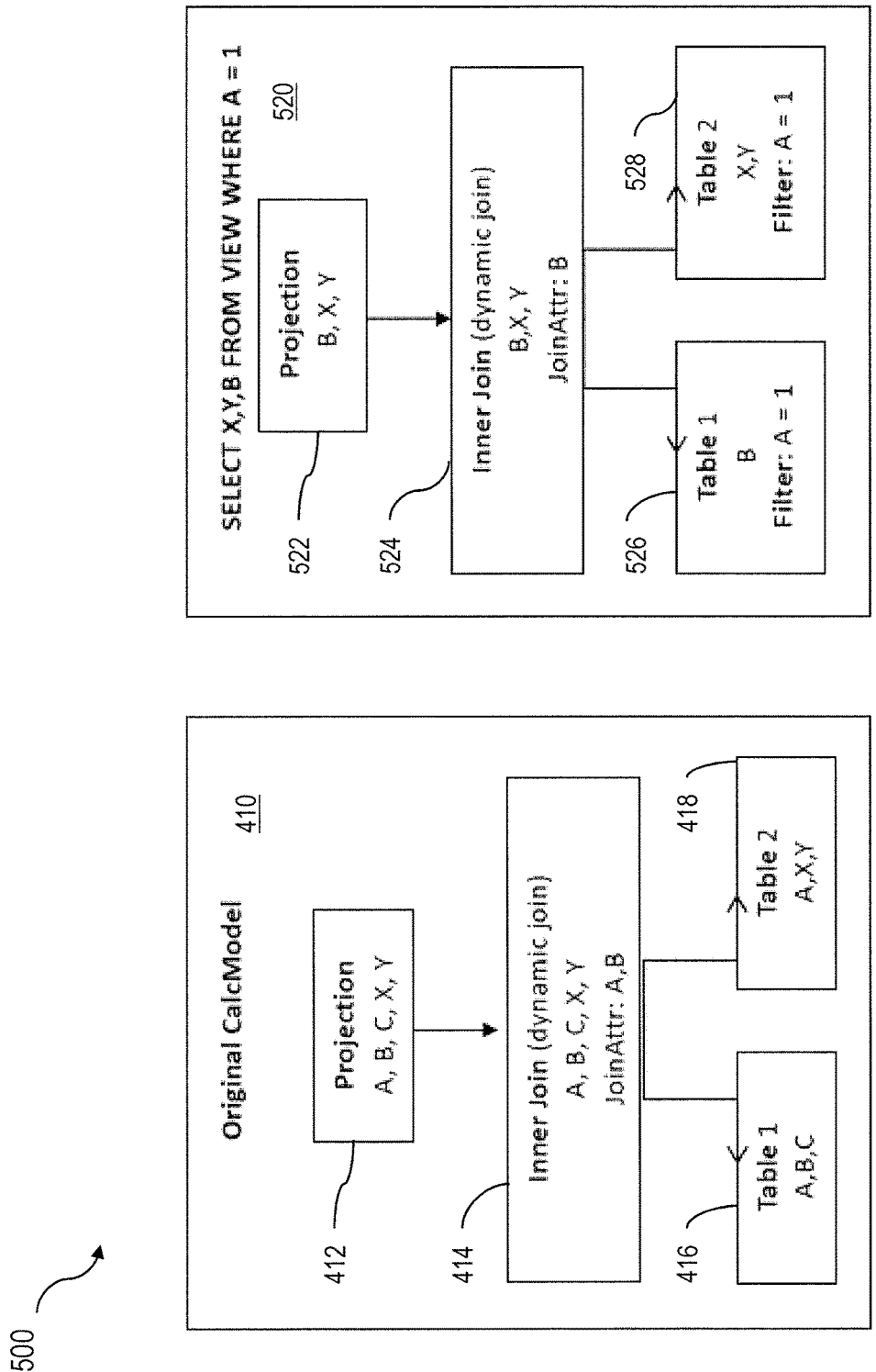
FIG. 5 is a diagram illustrating a second calculation scenario and a corresponding instantiation of the second calculation scenario having a forced filter pushdown and that removes unnecessary join attributes.

FIG. 5 is a diagram 500 illustrating the calculation model 410 of FIG. 4 and a corresponding instantiated calculation model 520 in response to receiving a query: SELECT X, Y, B FROM VIEW WHERE A=1. Attributes which are flagged for a forced filter push down and which can be successful removed from the dataflow graph, are not used as join-attributes on joins any more, as illustrated in the instantiated calculation model 520. In order to provide such functionality, the calculation engine 320 can consider all dynamic join operators during the runtime evaluation of the enforced filter push down. If a filter attribute can be pushed down to a child operator and successfully removed on the same node, the evaluation logic can also consider and rewrite dynamic join operations by removing non required join-attributes from the instantiated calculation model 520.

In this example, query requests a projection along attributes B, X, Y including a filter on attribute A which is marked for a forced filter push down (at node 522). The filter is pushed down to the table level (both Table 1 416 and Table 2 418 have the filter A=1) and, additionally, attribute A is removed from the dynamic join operation at node 524, thereby reducing intermediate results and changing the join operation semantic. By providing this extended behavior, users can mix dynamic joins and forced filter push down semantics at the same time and therefore are able to express very flexible model representations in their calculation models 315.

Figure 6:
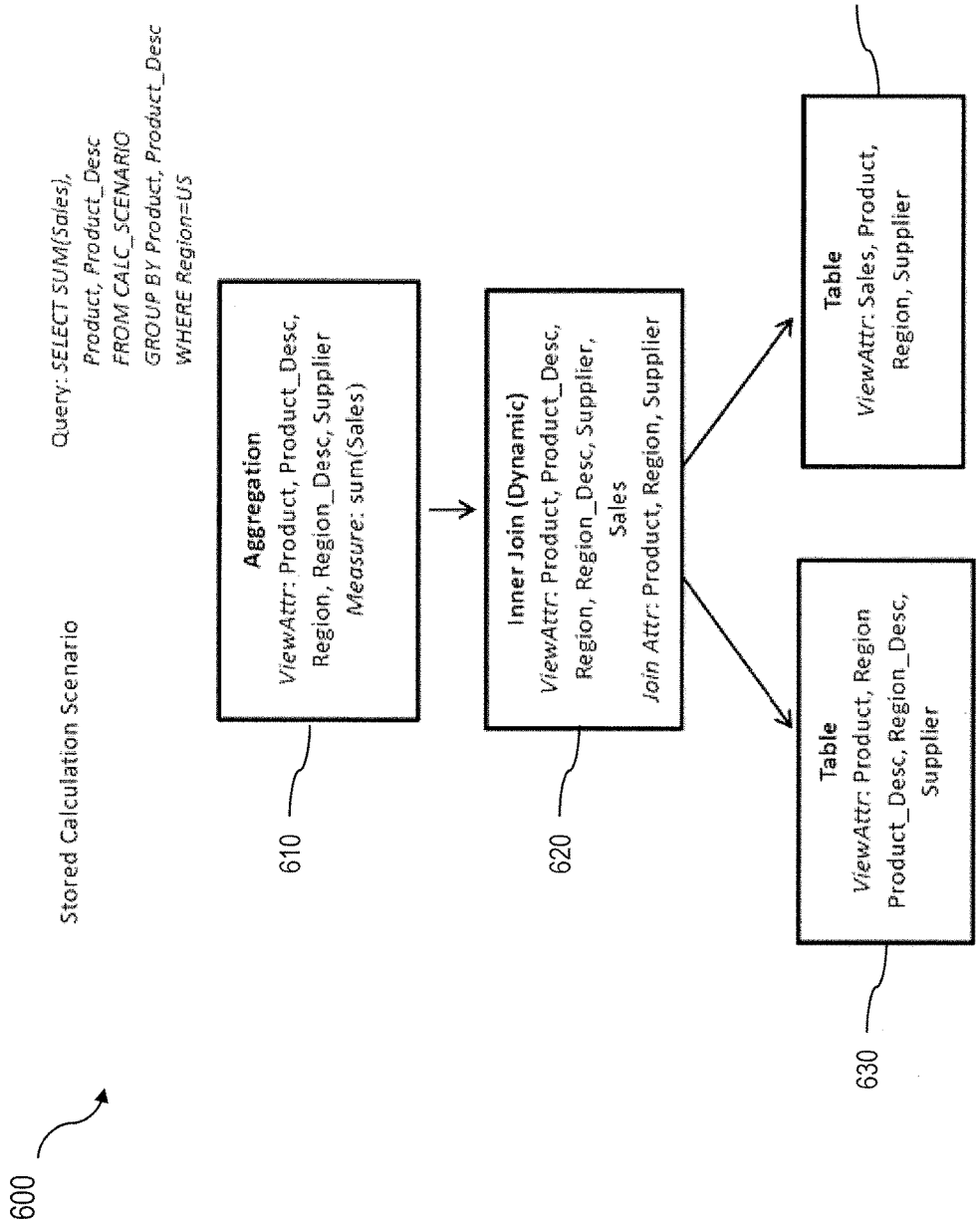
FIG. 6 is a diagram illustrating a third calculation scenario.
Figure 7:
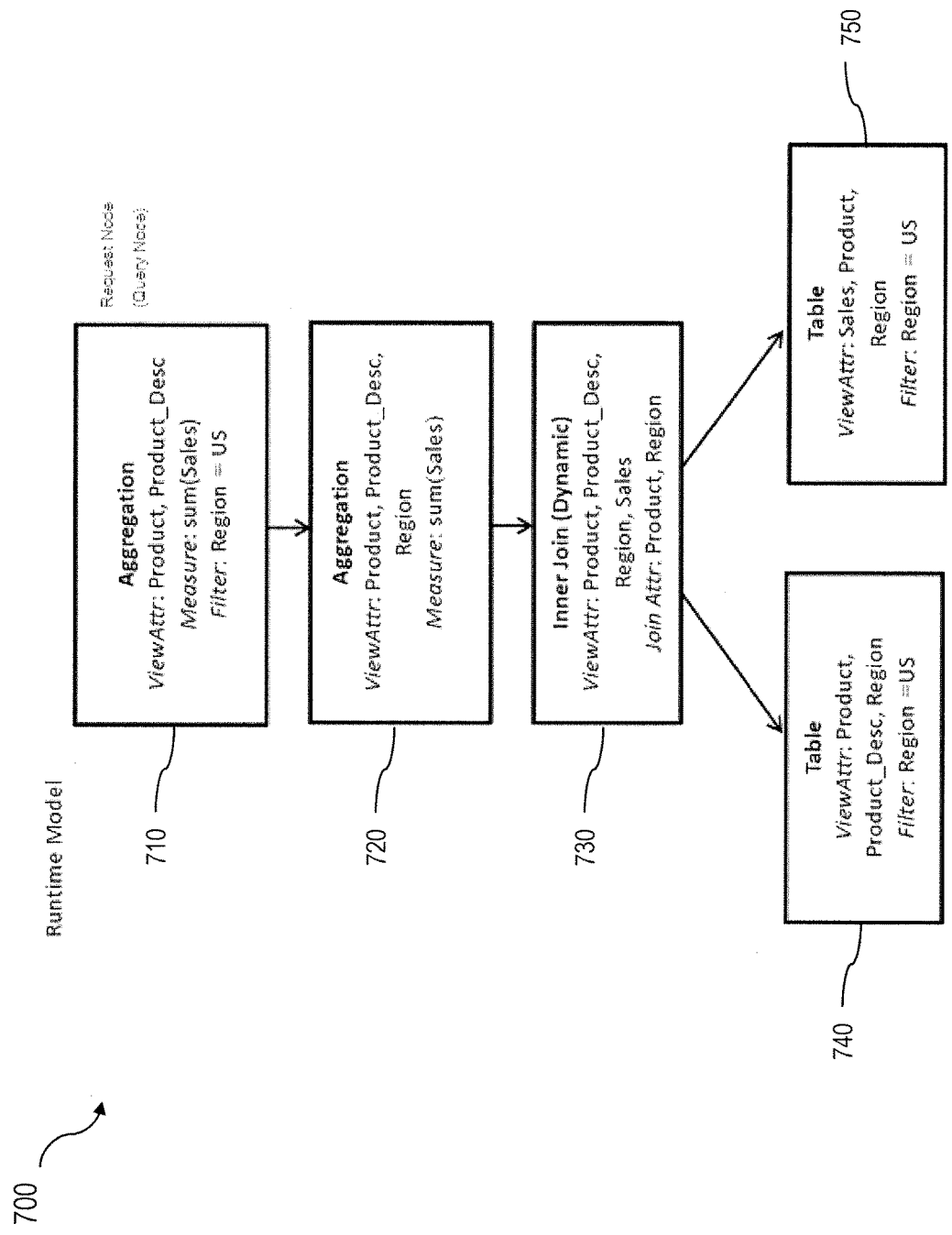
FIG. 7 is a diagram illustrating a first instantiation of the third calculation scenario of FIG. 6.

FIG. 6 is a diagram 600 of an example stored calculation scenario. With this calculation scenario, two tables 630, 640 are dynamically joined 620 as part of an aggregation operation 610. FIG. 7 is a diagram 700 illustrating an instantiated calculation scenario (i.e., runtime model) that corresponds to the calculation scenario of FIG. 6 that does not include a forced filter pushdown but includes a dynamic join. With FIG. 7, for the query: SELECT SUM (Sales), Product, Product_Desc FROM CALC_SCENARIO GROUP BY Product, Product_Desc, WHERE Region=US, the filter attribute: Region=US is part of the request node 710. In addition, the inner join (dynamic join) 730 and the aggregation node 720 include the Region attribute.

Figure 8:
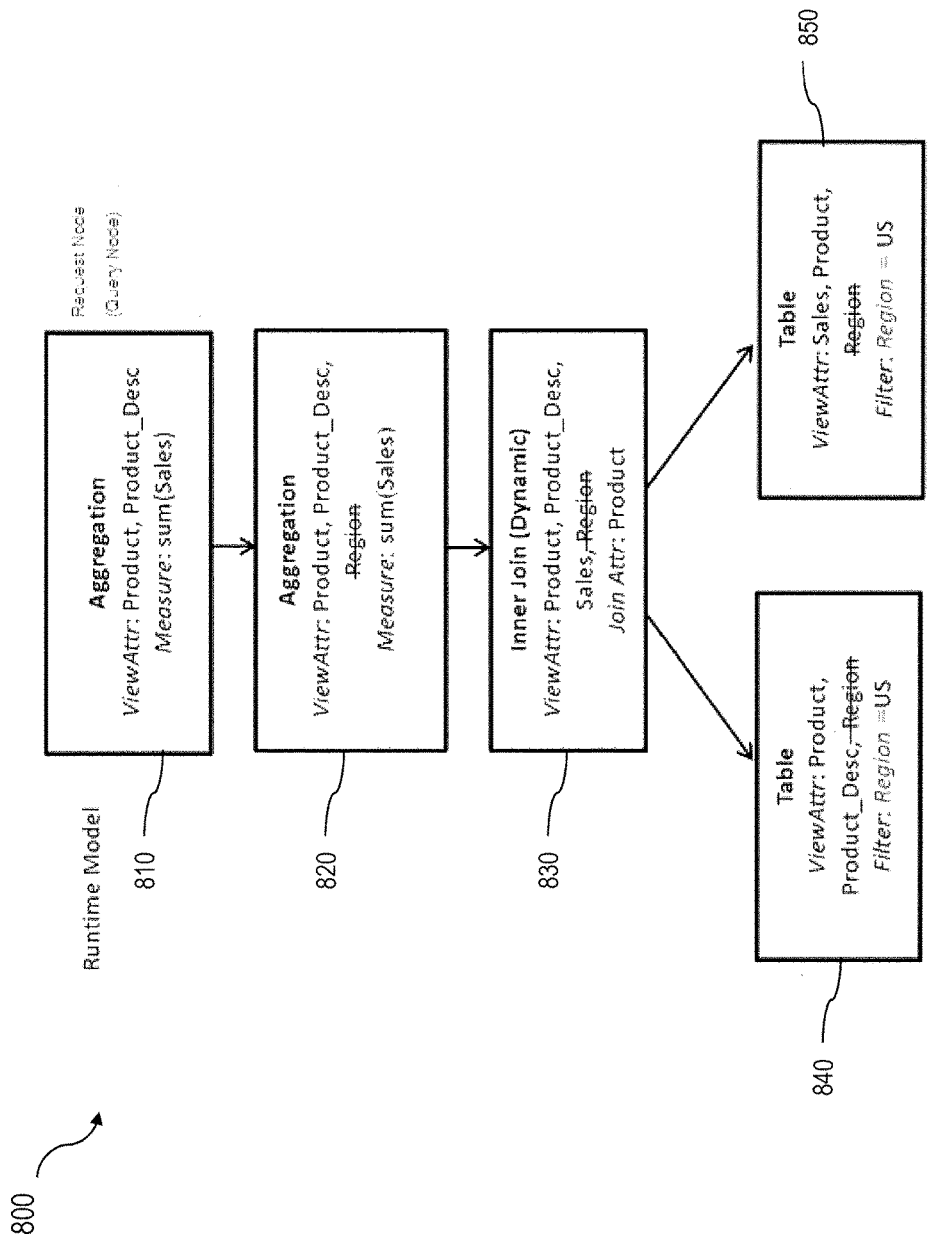
FIG. 8 is a diagram illustrating a second instantiation of the third calculation scenario of FIG. 6 having a forced filter pushdown and that removes unnecessary join attributes.

FIG. 8 is a diagram 800 which, in contrast to that of FIG. 7, includes an instantiated calculation scenario that corresponds to the calculation scenario of FIG. 6 that includes a forced filter pushdown on attribute Region. In this case, the filter Region=US is pushed down to the lowest available child node, namely the underlying tables 840, 850. Further, the Region attribute is removed from both the inner join node 830 and the aggregation node 820. Therefore, the Region attribute does not form part of either of the join or aggregation operations which results in more efficient and more rapid query processing.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method comprising:

receiving, by a database server from a remote application server, a query requesting a filter attribute that is associated with a calculation scenario that defines a data flow model that includes one or more calculation nodes arranged in a hierarchy;

instantiating, by the database server, the calculation scenario, the instantiating of the calculation scenario optimizes the calculation scenario by at least:

in response to determining that the filter attribute is not requested by one or more ancestor calculation nodes of the calculation scenario, pushing down the filter attribute to a lowest available descendent calculation node of the calculation scenario; and in response to the filter attribute being pushed down, removing the filter attribute from at least one ancestor node of the lowest available descendent calculation nodes that define a dynamic join operation, the dynamic join operation joining a first table and a second table based on a plurality of join attributes, the removal of the filter attribute comprising removing the filter attribute as one of the plurality of join attributes for joining the first table and the second table, and the removal of the filter attribute as the one of the plurality of join attributes reducing an intermediate result of one or more calculation nodes comprising the data flow model;

executing, by the database server, the query by at least performing the operations defined by the calculation nodes of the optimized calculation scenario, the executing of the query resulting in a responsive data set; and providing, by the database server to the application server, the data set.

2. A method as in claim 1, wherein at least a portion of paths and/or attributes defined by the calculation scenario are not required to respond to the query, and wherein the instantiated calculation scenario omits the paths and attributes defined by the calculation scenario that are not required to respond to the query.

3. A method as in claim 1, wherein at least one of the calculation nodes filters results obtained from the database server.

4. A method as in claim 1, wherein at least one of the calculation nodes sorts results obtained from the database server.

5. A method as in claim 1, wherein the calculation scenario is instantiated in a calculation engine layer by a calculation engine.

6. A method as in claim 5, wherein the calculation engine layer interacts with a physical table pool and a logical layer, the physical table pool comprising physical tables containing data to be queried, and the logical layer defining a logical metamodel joining at least a portion of the physical tables in the physical table pool.

7. A method as in claim 6, wherein the calculation engine invokes an SQL processor for executing set operations.

8. A method as in claim 1, wherein an input for each calculation node comprises one or more of: a physical index, a join index, an OLAP index, and another calculation node.

9. A method as in claim 8, wherein each calculation node has at least one output table that is used to generate the data set.

10. A method as in claim 9, wherein at least one calculation node consumes an output table of another calculation node.

11. A method as in claim 1, wherein the executing comprises:

forwarding the query to a calculation node in the calculation scenario that is identified as a default node if the query does not specify a calculation node at which the query should be executed.

12. A method as in claim 1, wherein the calculation scenario comprises database metadata.

13. A non-transitory computer program product storing instructions which, when executed by at least one data processor forming part of at least one computing device, result in operations comprising:

receiving, by a database server from a remote application server, a query requesting a filter attribute that is associated with a calculation scenario that defines a data flow model that includes one or more calculation nodes arranged in a hierarchy;

instantiating, by the database server, the calculation scenario, the instantiating of the calculation scenario optimizes the calculation scenario by at least:

in response to determining that the filter attribute is not requested by one or more ancestor calculation nodes of the calculation scenario, pushing down the filter attribute to a lowest available descendent calculation node of the calculation scenario; and in response to the filter attribute being pushed down, removing the filter attribute from at least one ancestor node of the lowest available descendent calculation nodes that define a dynamic join operation, the dynamic join operation joining a first table and a second table based on a plurality of join attributes, the removal of the filter attribute comprising removing the filter attribute as one of the plurality of join attributes for joining the first table and the second table, and the removal of the filter attribute as the one of the plurality of join attributes reducing an intermediate result of one or more calculation nodes comprising the data flow model;

executing, by the database server, the query by at least performing the operations defined by the calculation nodes of the optimized calculation scenario, the executing of the query resulting in a responsive data set; and providing, by the database server to the application server, the data set.

14. A computer program product as in claim 13, wherein at least a portion of paths and/or attributes defined by the calculation scenario are not required to respond to the query, and wherein the instantiated calculation scenario omits the paths and attributes defined by the calculation scenario that are not required to respond to the query.

15. A computer program product as in claim 13, wherein at least one of the calculation nodes filters results obtained from the database server.

16. A computer program product as in claim 13, wherein at least one of the calculation nodes sorts results obtained from the database server.

17. A computer program product as in claim 13, wherein the calculation scenario is instantiated in a calculation engine layer by a calculation engine.

18. A computer program product as in claim 17, wherein the calculation engine layer interacts with a physical table pool and a logical layer, the physical table pool comprising physical tables containing data to be queried, and the logical layer defining a logical metamodel joining at least a portion of the physical tables in the physical table pool.

19. A computer program product as in claim 18, wherein the calculation engine invokes an SQL processor for executing set operations.

20. A system comprising:
   at least one data processor; and
   memory storing instructions which, when executed by the at least one data processor, result in operations comprising:
      receiving, by a database server from a remote application server, a query requesting a filter attribute that is associated with a calculation scenario that defines a data flow model that includes one or more calculation nodes arranged in a hierarchy;
      instantiating, by the database server, the calculation scenario, the instantiating of the calculation scenario optimizes the calculation scenario by at least:
         in response to determining that the filter attribute is not requested by one or more ancestor calculation nodes of the calculation scenario, pushing down the filter attribute to a lowest available descendent calculation node of the calculation scenario; and
         in response to the filter attribute being pushed down, removing the filter attribute from at least one ancestor node of the lowest available descendent calculation nodes that define a dynamic join operation, the dynamic join operation joining a first table and a second table based on a plurality of join attributes, the removal of the filter attribute comprising removing the filter attribute as one of the plurality of join attributes for joining the first table and the second table, and the removal of the filter attribute as the one of the plurality of join attributes reducing an intermediate result of one or more calculation nodes comprising the data flow model;
      executing, by the database server, the query by at least performing the operations defined by the calculation nodes of the optimized calculation scenario, the executing of the query resulting in a responsive data set; and
      providing, by the database server to the application server, the data set.

* * * * *